United States Patent

Shirasawa et al.

[11] Patent Number: 5,696,842
[45] Date of Patent: Dec. 9, 1997

[54] IMAGE PROCESSING SYSTEM FOR ADAPTIVE CODING OF COLOR DOCUMENT IMAGES

[75] Inventors: Hisao Shirasawa, Yokohama; Wasaku Yamada, Mitaka, both of Japan

[73] Assignee: Ricoh Company, Ltd., Tokyo, Japan

[21] Appl. No.: 300,846

[22] Filed: Sep. 6, 1994

Related U.S. Application Data

[63] Continuation of Ser. No. 906,461, Jun. 30, 1992, abandoned.

[30] Foreign Application Priority Data

Jul. 4, 1991 [JP] Japan .................................. 3-164377
Nov. 15, 1991 [JP] Japan .................................. 3-327136

[51] Int. Cl.⁶ .................................................. G06K 9/34
[52] U.S. Cl. ........................... 382/176; 382/239; 382/257; 358/462
[58] Field of Search .................................. 382/9, 17, 54, 382/56, 176, 239, 257, 266, 267, 268; 358/426, 433, 462

[56] References Cited

U.S. PATENT DOCUMENTS

| | | | |
|---|---|---|---|
| 4,668,995 | 5/1987 | Chen et al. | 358/462 |
| 4,899,225 | 2/1990 | Sasuga et al. | 358/462 |
| 4,922,349 | 5/1990 | Abe et al. | 358/433 |
| 5,025,481 | 6/1991 | Ohuchi | 382/53 |
| 5,073,953 | 12/1991 | Westdijk | 358/462 |
| 5,134,666 | 7/1992 | Imao et al. | 382/9 |
| 5,134,667 | 7/1992 | Suzuki | 382/54 |
| 5,148,495 | 9/1992 | Imao et al. | 382/9 |
| 5,151,949 | 9/1992 | Miyata | 382/176 |
| 5,361,147 | 11/1994 | Katayama et al. | 358/539 |

OTHER PUBLICATIONS

A. Katayama, "Encoding System for Character/Picture Documents", Institute of Image Processing and Electronics Engineers of Japan, No. 31, 1990, pp. 131–136.

*Primary Examiner*—Leo Boudreau
*Assistant Examiner*—Chris Kelley
*Attorney, Agent, or Firm*—Woodcock Washburn Kurtz Mackiewicz & Norris LLP

[57] ABSTRACT

An image processing system includes an input part for reading an image from a color document containing a multilevel gradation graphic image and a text image, a region separator part for separating the image into a plurality of elemental blocks having M×N picture elements according to a type of image data that is contained in each elemental block, whether the elemental block contains a black-and-white line portion of the image or a halftone portion of the image, and an encoding part for encoding image data in the black-and-white line portion through an encoding process appropriate for bi-level image data and for encoding image data in the halftone portion through an encoding process appropriate for multilevel gradation image data so as to produce a compressed image.

21 Claims, 13 Drawing Sheets

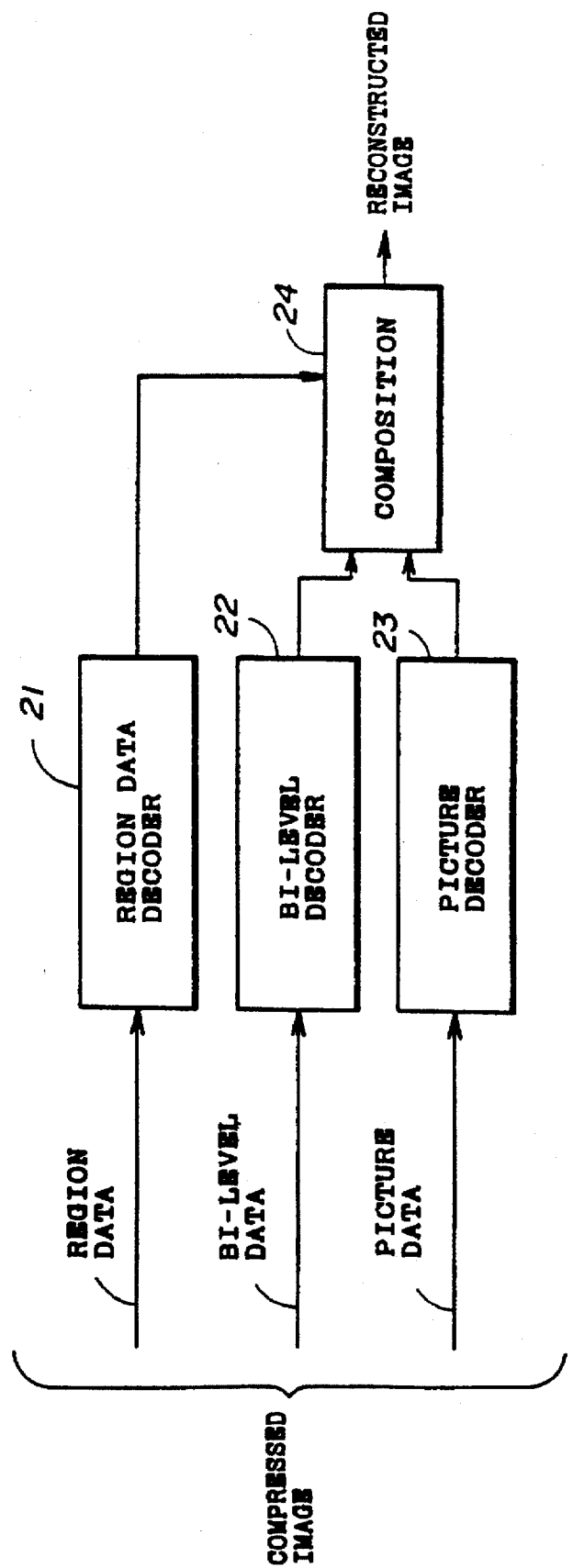

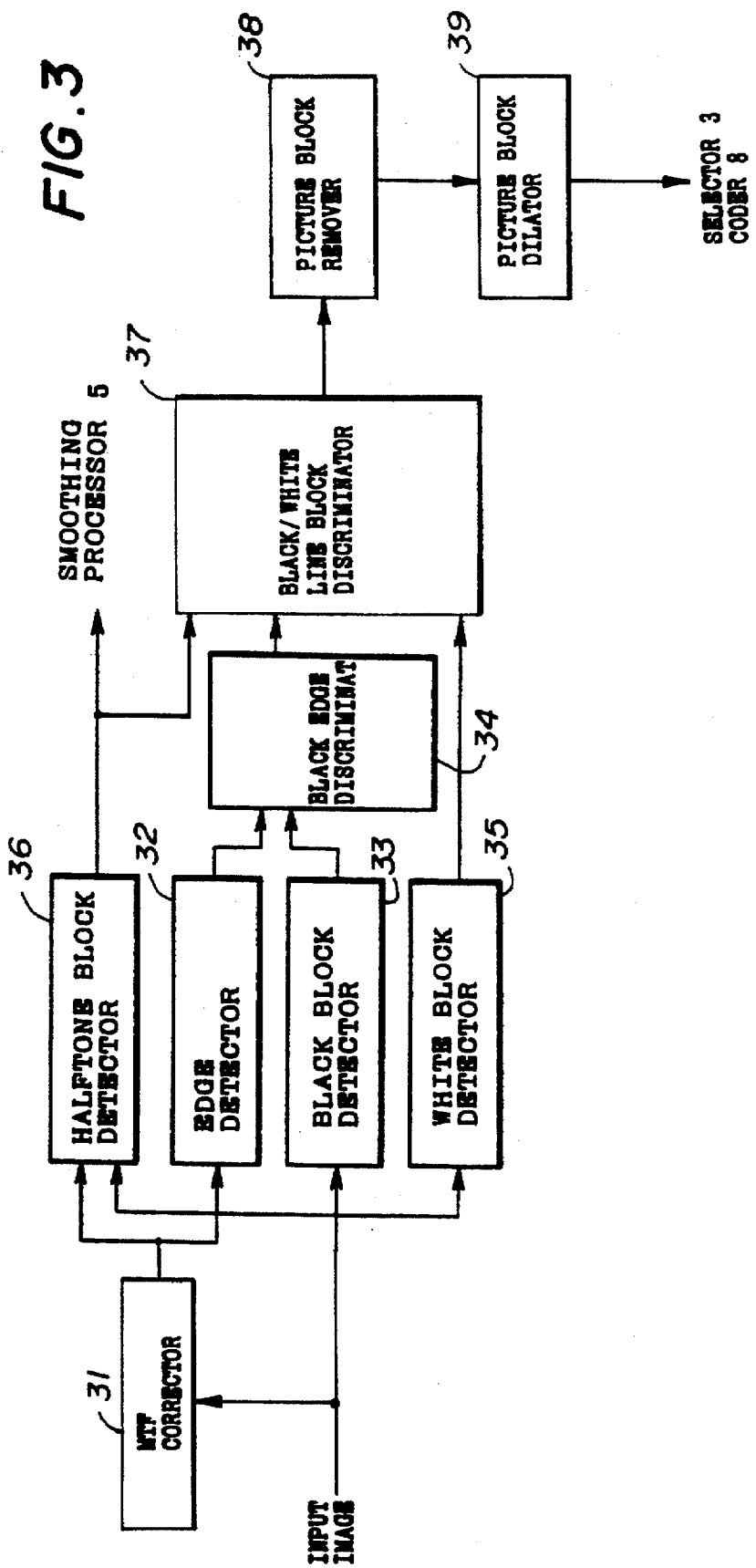

- ● BLACK DOT ( ≧ THb1 )
- ○ WHITE DOT ( < THb1 )
- × ANY DOT

- ○ WHITE DOT ( < THw1 )
- × ANY DOT

⊠ ··· PICTURE BLOCK

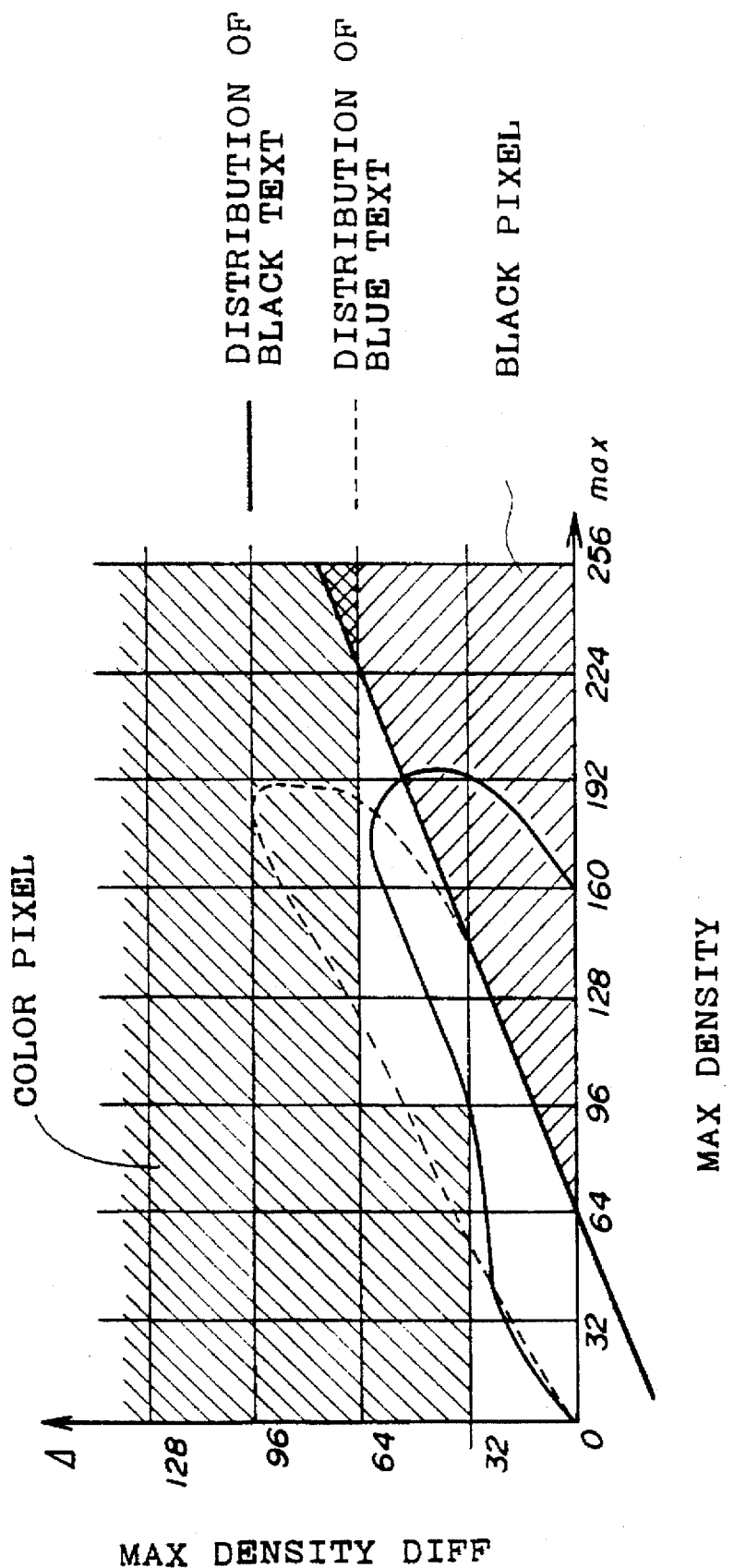

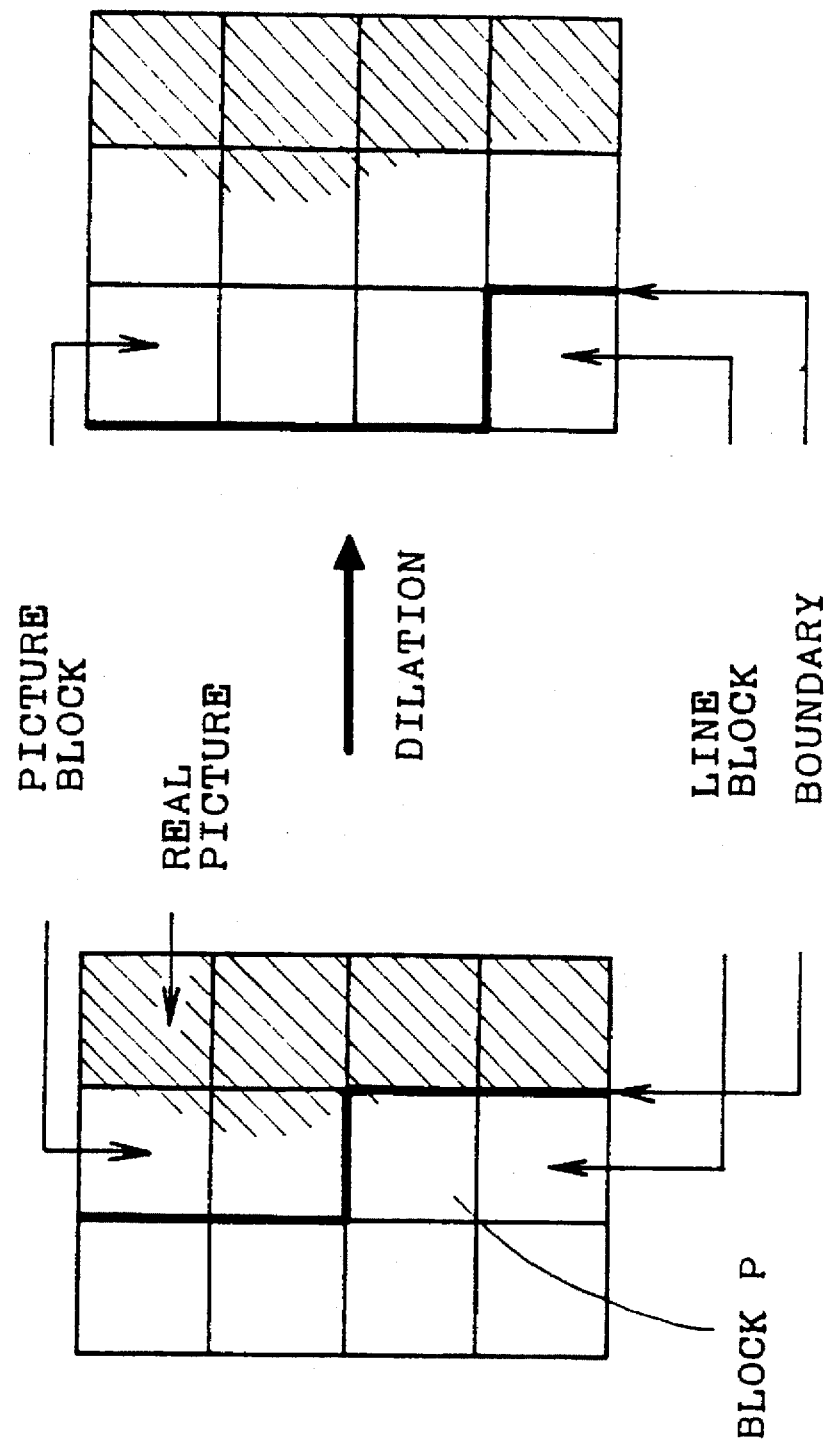

121: TEXT BLOCK
122, 123: PICTURE BLOCK
124 DISTORTION

IMAGE PROCESSING SYSTEM FOR ADAPTIVE CODING OF COLOR DOCUMENT IMAGES

This is a continuation of U.S. patent application Ser. No. 07/906,461, filed Jun. 30, 1992 now abandoned.

BACKGROUND OF THE INVENTION

The present invention generally relates to an image processing system, and more particularly to an image processing system for separating an image read out from a color document into a text region and a graphic region, and for encoding image data in each region through an encoding process appropriate for that particular region to produce a compressed image. The present invention also particularly relates to an image processing system for producing a reconstructed image from a compressed image through a decoding process.

In color facsimile machines and electronic filing systems, a transmitted image usually contains a large amount of image information, and it is desirable to effectively achieve a higher compression rate of the transmitted image. An image which is copied, transmitted or received in the above mentioned systems may be a composite image in which a dot image and a line image coexist. The dot image refers to a photograph, a picture or the like which is described by dots, while the line image refers to a character or the like which is described by lines. These two kinds of images in the composite image have different frequency characteristics, and it is difficult to achieve a high compression rate of the transmitted image without seriously degrading the image quality, by applying a single encoding process to the two kinds of images.

For example, if a composite image is encoded by means of an adaptive discrete cosine transform (ADCT) encoding system, the encoding efficiency of a black-and-white text region of the composite image becomes poor and the picture quality of the text region is degraded, because an encoding process appropriate for a multilevel gradation image is carried out with respect to a bi-level image of the black-and-white text region. Thus, in some cases, a character image may collapse or a picture noise may appear in the vicinity of the black-and-white text region of the output image.

In order to eliminate the above mentioned problems, an improved adaptive encoding technique has been proposed in which a dynamic arithmetic encoding process (the QM-Coder) is applied to a bi-level text region and the above ADCT encoding process is applied to the remaining regions of the composite image. Such is the subject of a transaction, No. 31, pp.131–136, 1990, entitled "Encoding System For Character/Picture Composite Documents" by A. Katayama et al. issued by Institute of Image Processing and Electronics Engineers of Japan. Another improved technique has been proposed, in which a rectangular region surrounding a character or graphics is generated within an image and an encoding process appropriate for the rectangular region is carried out. However, there is no disclosure regarding the image region segmentation which accurately segments the image into a text region and a picture region.

In the above mentioned prior art, a black-and-white line region containing a number of black edges and a number of white pixels a total number of which is greater than a predetermined reference value is not accurately separated from a color composite image, and the encoding process is performed with respect to each pixel of a target block in accordance with the results of such a region separation. Thus, there is a problem in that the image encoding process is not so efficient, and it is difficult to improve the quality of the text region of the compressed image when the above mentioned techniques are applied.

SUMMARY OF THE INVENTION

Accordingly, it is a general object of the present invention to provide an improved image processing system in which the above described problems are eliminated.

Another, more specific object of the present invention is to provide an image processing system in which an image is read out from a color document, the image is correctly separated into a black-and-white line region and a picture region, and bi-level image data contained in the black-and-white line region is encoded via an arithmetic encoding process (the QM-Coder) and multilevel image data contained in the picture region is encoded via an ADCT encoding process in order to achieve a higher compression rate and improve the quality of a compressed image.

Still another object of the present invention is to provide an image processing system in which image data contained in a screened halftone region of the image only undergoes a smoothing process without performing the smoothing process for non-black, color text image data in order to improve the quality of the color text of the compressed image.

A further object of the present invention is to provide an image processing system in which, after an image is reconstructed from a compressed image via a decoding process, image data of the reconstructed image undergoes a density correction process in order to improve the quality of the reconstructed image.

The above described objects of the present invention are achieved by an image processing system which includes an input part for reading an image from a color document containing a multilevel gradation graphic image and a text image, a region separator part for separating the image into a plurality of elemental blocks having M×N picture elements according to a type of image data that is contained in each elemental block, whether the elemental block contains a black-and-white line portion of the image or a halftone portion of the image, and an encoding part for encoding image data in the black-and-white line portion through an encoding process appropriate for bi-level image data and for encoding image data in the halftone portion through an encoding process appropriate for multilevel gradation image data so as to produce a compressed image. In the image processing system, the region separator part includes a detector for detecting whether or not each elemental block contains a black-and-white line portion of the image by checking whether a total number of the number of black edges contained in the elemental block plus the number of white picture elements contained in the elemental block is greater than a predetermined value, and whether a halftone picture element is not contained in the elemental block, the detector detecting the elemental block as containing a halftone portion of the image if it is detected that the elemental block does not contain a black-and-white line portion of the image. The image processing system also includes a decoding part for outputting a reconstructed image from a compressed image through a decoding process, and a smoothing processor for carrying out a smoothing process with respect to picture elements lying at boundary parts between a text region of the reconstructed image and a picture region thereof after the decoding process is carried out.

According to the present invention, it is possible to accurately separate the original image into the black-andwhite line region and the picture region. Since image data in the black-and-white line region is encoded through the bi-level encoding process appropriate for coding a text image, it is possible to remarkably reduce the amount of information required for encoding the image data. Also, since the bi-level rendition process for image data in the black-and-white line region is performed after the sharpening process is performed, it is possible to improve the quality of the black character image. Also, since a density correction process is performed before the encoding process is performed or after a decoding process is performed, it is possible to eliminate a distortion from a reconstructed image.

Other objects and further features of the present invention will become apparent from the following detailed description when read in conjunction with the accompanying drawings.

BRIEF DESCRIPTION OF THE DRAWINGS

FIG. 2 is a block diagram showing a decoding part of the image processing system for producing a reconstructed image from the compressed image according to the present invention;

FIG. 3 is a block diagram showing a region separator of the encoding part of the image processing system of FIG. 1;

FIG. 4 is a diagram showing a set of coefficients used by an MTF corrector of the region separator of FIG. 3;

FIG. 7 is a chart for explaining the correspondence between the maximum density and the maximum density difference with respect to image data of a color image;

FIG. 9 is a diagram for explaining a dilation process performed by a picture block dilation part of the region separator of FIG. 3;

DESCRIPTION OF THE PREFERRED EMBODIMENTS

Figure 1:
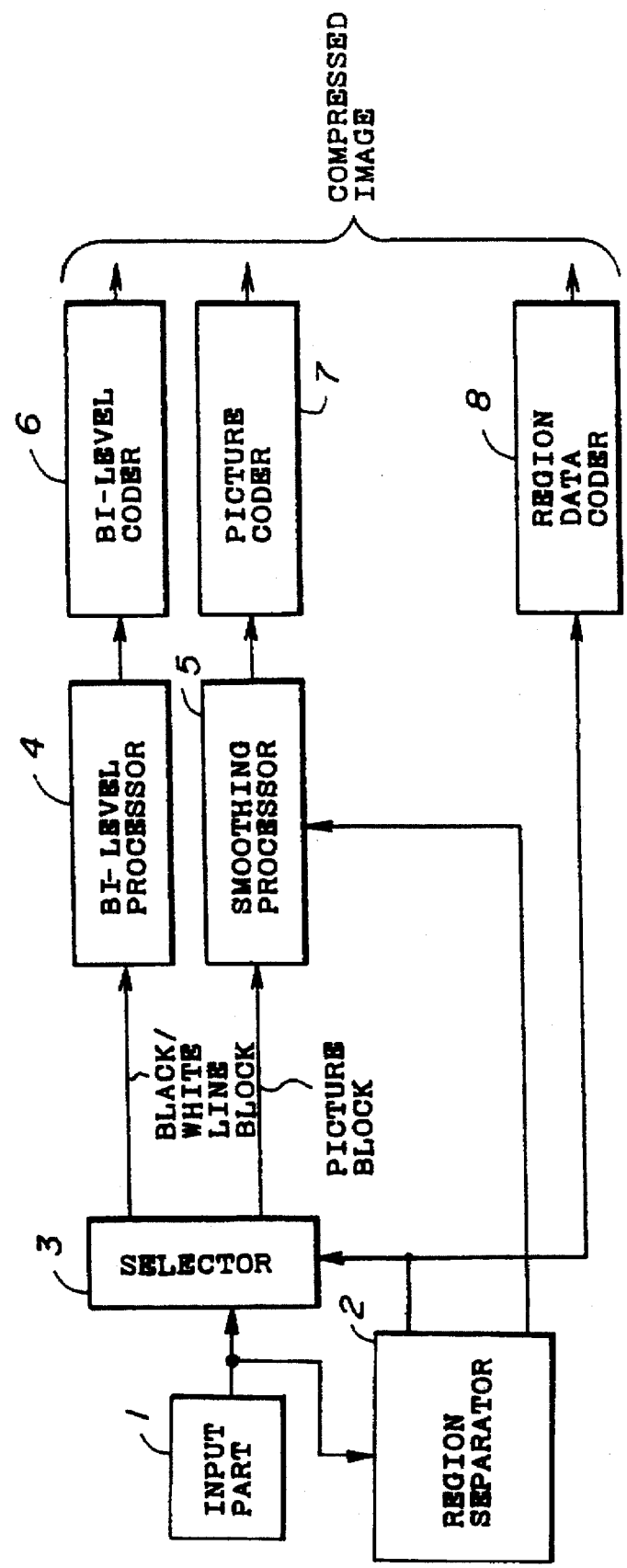
FIG. 1 is a block diagram showing an encoding part of an image processing system for producing a compressed image from an original image according to the present invention.

A description will now be given of a first embodiment of an image processing system according to the present invention, with reference to FIG. 1. FIG. 1 shows an encoding part of the image processing system for encoding a composite image read from a color document. In this encoding part of the image processing system, a composite image is read from a color document by a scanner, each block of the composite image being accurately segmented into a text region and a picture region, and image data in the text region being encoded by an arithmetic encoding process appropriate for bi-level images, and image data in the picture region being encoded by an ADCT encoding process appropriate for graphic images.

In the encoding part of FIG. 1, an input part 1 includes a scanner for reading an image from a color document. This scanner is capable of producing an image having a resolution of 400 dpi. The original color image is separated into three primary color signals (red, green and blue (RGB) signals) by the input part 1, each color signal including gradation data for representing 256 density levels. For example, a white pixel of the original image is represented by (R, G, B)=(0, 0, 0), and a black pixel thereof is represented by (R, G, B)=(256, 256, 256). In a region separator 2, the original image is grouped into 16×16 blocks. Each block of the original image output by the region separator 2 has a size of 16×16 pixels, and this format of image data is in accordance with an ADCT encoding format when sub-sampling of Y:Cr:Cb=4:1:1 is used.

After image data for each block of the original image is received, the region separator 2 performs a region segmentation process. In this region segmentation process, the region separator 2 detects whether image data of each block constitutes a black-and-white line region of the original image or a picture region thereof. When the block is detected by the region separator 2 as constituting a black-and-white line region of the original image, a selector 3 supplies the image data to a bi-level processor 4. When the image data of the block is detected as constituting a picture region of the original image, the selector 3 supplies the image data to a smoothing processor 5.

In the bi-level processor 4, a sharpening process is performed for the image data received from the selector 3, and the image data is binarized. After the binarized image data is received, a bi-level coder 6 performs an arithmetic coding process appropriate for bi-level image data in the black-and-white line region, such as the QM-Coder process. In the smoothing processor 5, a smoothing process is performed for the image data received from the selector 3, in order to eliminate the moire from an output image and to improve the compression rate. After the image data is received from the smoothing processor 5, a picture coder 7 performs an encoding process appropriate for picture data in the picture region (continuous halftone areas or screened halftone areas), such as the ADCT encoding process.

After region data, which indicates whether image data of each block constitutes the black-and-white line region or the picture region of the original image, is received from the region separator 2, a region data coder 8 encodes the region data in a reversible format with respect to each of 16×16 blocks of the original image. This region data is represented by 1-bit data per block with respect to each of the blocks included in the original image. Thus, the amount of the region data is negligible relative to the amount of the bi-level data or the picture data.

The image processing system thus produces a compressed image by means of the bi-level coder 6, the picture coder 7 and the region data coder 8, and the compressed image may be transmitted to an external facsimile machine via a transmission line, or may be stored in a recording medium (or, a file).

FIG. 2 shows a decoding part of the image processing system according to the present invention for producing a reconstructed image from a compressed image. In FIG. 2, after the compressed image is received, a region data decoder 21 decodes a region data of the compressed image, a bi-level decoder 22 decodes a bi-level data of the compressed image indicating text image data in the black-and-white line region, and a picture decoder 23 decodes a picture data thereof indicating graphic image data in the dot region. In accordance with the region data supplied by the region data decoder 21, a composition part 24 performs image composition of the text image data supplied by the bi-level decoder 22 and the graphic image data supplied by the picture decoder 23. The composition part 24 outputs a reconstructed image to a cathode ray tube CRT display or a printer.

FIG. 3 shows the region separator 2 of the image processing system of FIG. 1. As described above, the region separator 2 detects whether image data of each 16×16 block constitutes a black-and-white line region or a picture region, and separates the original image into the black-and-white line region and the picture region with respect to each block. According to the present invention, the black-and-white line region or block refers to a region or block of an image in which a total number of the number of black edges included in a target block plus the number of white pixels included thereon is greater than a predetermined value and no halftone dot is included in the target block, while the picture region or block refers to a region or block which is different from the black-and-white line region or block being detected. A composite region or block in which a black-and-white line image and a picture image coexist is detected as constituting the picture region because bi-level rendition of image data in such a composite block may seriously degrade the picture quality if the encoding process is performed.

The image region separation process performed by the image processing system of the present invention will now be summarized.

(1) The original image is separated into edge portions, black pixel regions, halftone regions, and white pixel regions by the region separator.

(2) In accordance with the result of the region separation, a black-and-white line region is discriminated when a total number of the number of black edges and the number of white pixels in a target block is greater than a reference value and no halftone dot is contained. Also, a picture region is discriminated when the target block is not a black-and-white line region.

(3) In accordance with the result of the black-and-white line region discrimination, a region data of an isolated picture block within the black-and-white line region is changed to a region data corresponding to a black-and-white line block.

(4) In order to avoid erroneous separation of an outline part of the picture region into a black-and-white line block, a dilation process is carried out with respect to the picture region.

A description will be given of the components of the region separator 2, with reference to FIG. 3. In FIG. 3, this region separator includes an MTF corrector 31, an edge detector 32, a black block detector 33, a black edge discriminator 34, a white block detector 35, a halftone block detector 36, a black/white line block discriminator 37, a picture block remover 38, and a picture block dilation part 39. The MTF corrector 31 performs a sharpening process in which edges of the original image are sharpened or intensified. This sharpening process is performed by using a filtering matrix of fifteen coefficients arranged in 5×3 formation as shown in FIG. 4. In this embodiment, among the three primary color signals of red, green and blue (RGB) signals indicating each pixel of the original image, the MTF corrector 31 generates correction data from the green signal (G). The correction data, output by the MTF corrector 31 with respect to each pixel of the original image, is used by the edge detector 32, the halftone block detector 36, and the bi-level processor 4, respectively.

Figure 5:
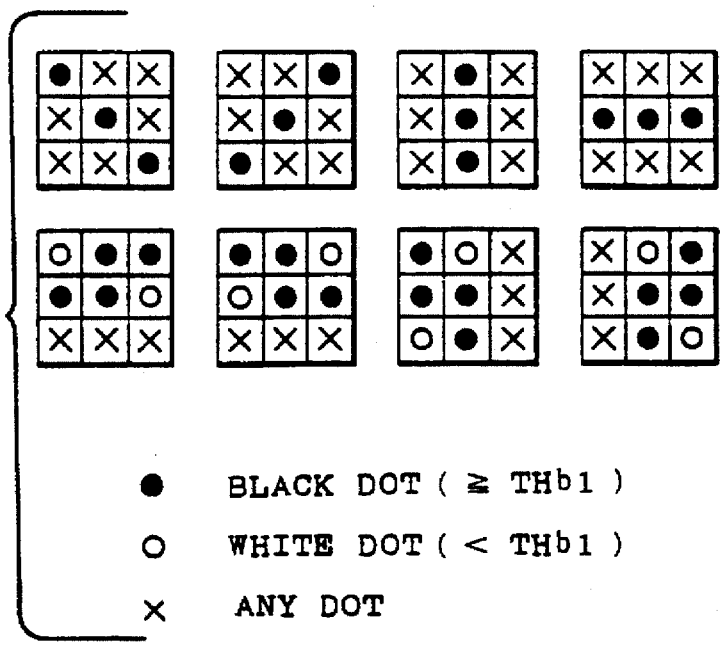
FIG. 5 is a diagram showing a set of predetermined matrix patterns for detecting whether or not a center pixel of a 3×3 block is a part of black successive pixels.
Figure 6:
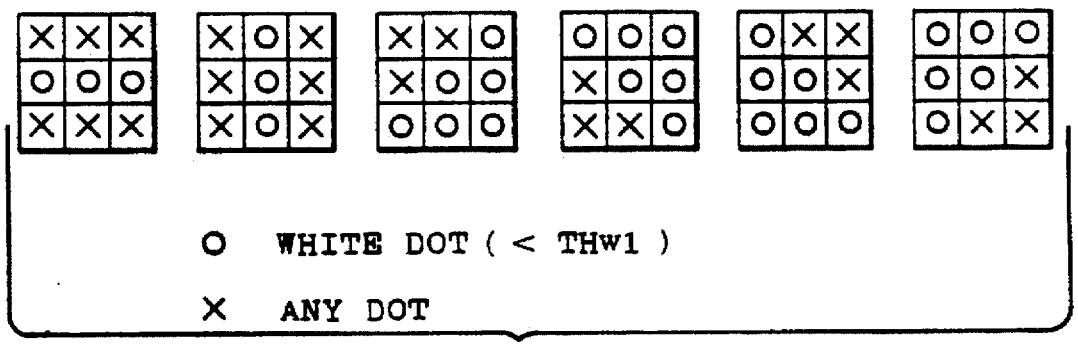
FIG. 6 is a diagram showing a set of predetermined matrix patterns for detecting whether or not a center pixel of a 3×3 block is a part of white successive pixels.

The edge detector 32 produces bi-level data (either a black dot or a white dot) with respect to each pixel of the original image by comparing image data (the correction data output by the MTF corrector 31) with predetermined threshold values THb1 and THw1, respectively. When the image data (corrected by the MTF corrector 31) has a density level (or a gradation level) higher than or equal to the predetermined threshold value THb1, the image data is detected as indicating a black dot. For example, the edge detector 32 detects whether or not a center pixel of a matrix of 3×3 such image data constitutes a part of black successive pixels by pattern matching the matrix with eight predetermined 3×3 matrix patterns shown in FIG. 5. Similarly, when the image data has a density level lower than the predetermined threshold level THw1, the image data is detected as indicating a white dot. The edge detector 32 detects whether or not a center pixel of a matrix of 3×3 such image data constitutes a part of white successive pixels by pattern matching the matrix with six predetermined 3×3 matrix patterns shown in FIG. 6. The edge detector 32 then produces a 5×5 black block with respect to each black successive pixels being detected and a 5×5 white block with respect to each white successive pixels being detected. A region in which such a black block and a white block overlap with each other is detected as being an edge of the original image by the edge detector 32. Generally, an internal region of a black text image is detected as a part of a picture region. However, according to the present invention, such a region is detected as constituting a black-and-white line region by using a wider edge.

After the original image is received, the black block detector 33 groups the original image into 4×4 blocks wherein pixels are arranged in 4×4 formation. The black block detector 33 detects whether or not a pixel of each 4×4 block constitutes a part of a black block. For this purpose, the black block detector 33 discriminates between a black pixel and a color pixel for each pixel of the block on the basis of the maximum density Max (R, G, B) and the maximum density difference $\Delta$ (R, G, B) of image data corresponding to the pixel. Generally, it is difficult to discriminate between a black pixel and a blue pixel. FIG. 7 shows a blue text distribution area (a blue text distribution chart being indicated by a dotted line) and a black text distribution area (a black text distribution chart being indicated by a solid line) shown in the distribution chart of the maximum density Max (R, G, B) and the maximum density difference $\Delta$ (R, G, B). The black block detector 33 discriminates between a black pixel and a color pixel on the basis of this distribution chart. When the target pixel of the block pertains to the black text distribution area but not to the blue text distribution area ($\Delta$<(Max−64)/2), the target pixel is detected as being a black pixel. When the target pixel does not pertain to the black text distribution area (Max<96 and $\Delta$>32, Max $\geq$96 and $\Delta$>64), the target pixel is detected as being a color pixel.

The black block detector 33 makes a 4×4 block, containing 16 pixels arranged in 4×4 formation, active when two or more black pixels are included in that block or when one black pixel is included but no color pixel is included in that block. Then, the black block detector 33 detects whether or not a target block in a set of nine 4×4 blocks arranged in 3×3 formation is a black block. Only when two or more active blocks are included in the set of the nine 4×4 blocks, the black block detector 33 detects that the target block is a black block. Further, in order to avoid erroneous detection of edges of a picture region as being black edges, it is necessary to discriminate a color block in a screened halftone region or in a continuous halftone region from a black/white block in a black-and-white line region. This discrimination is made by using a feature that image data in the halftone regions has a relatively high level of the maximum density difference $\Delta$ (R, G, B). More specifically, when two or more pixels in a 4×4 block have a relatively high level of the maximum density difference $\Delta$ (R, G, B), the black block detector 33 detects that the block is the color block in the screened halftone region. When all the pixels in the 4×4 block are detected as being a color pixel, the black block detector 33 detects that the block is the color block in the continuous halftone region. Then, when a color block in a continuous halftone region or in a screened halftone region exists in a set of nine black blocks arranged in 3×3 formation, the black block detector 33 detects that a target block of the set of the black blocks is a non-black block. In other words, a black block on the periphery of the set of the black blocks is changed to a color block.

In accordance with the results of the detection performed by the edge detector 32 and the black block detector 33, the black edge discriminator 34 discriminates a black edge in the black-and-white line region by detecting whether or not a target pixel of each block as being included in a black block and being an edge of the original image. The white block detector 35 detects whether or not a target pixel of each block of the original image is a part of white successive pixels. When all the three primary color density levels (R, G, B) of the target pixel are lower than a corresponding threshold level, the target pixel is detected as being a part of white successive pixels. The halftone block detector 36 detects whether or not a target block of the original image constitutes a part of a screened halftone region. A peak value is detected from a local density gradient of the original image, and the above detection of the screened halftone region is made by the halftone block detector 36 on the basis of the extracted peak value.

With respect to each 16×16 block of the original image, the black/white line block discriminator 37 discriminates a black-and-white line region. As described above, the black-and-white line region refers to a region of the original image in which a total number of the number of black edges, detected by the discriminator 34, plus the number of white pixels, detected by the detector 35, in the target block is greater than a predetermined value N (for example, N=245), and no halftone dot is included in the target block. Since a density level of a white region surrounding a black edge is likely to increase, a dilation process is performed with respect to the black edge, in advance. A target block after the dilation process is performed has a size of 9×9 pixels.

Figure 8:
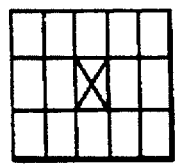
FIG. 8 is a diagram for explaining a picture block removal process performed by a picture block remover of the region separator of FIG. 3.

The isolated picture block remover 38 removes an isolated picture block within the black-and-white line region by changing the picture block to a black-and-white line block, in order to improve the accuracy of the segmentation of the black-and-white line region. In the first embodiment, the original image at a resolution of 400 dpi is used, and a picture region is always constituted by a plurality of blocks. Thus, it is conceivable that an isolated picture block occurs within the black-and-white line region as the result of erroneous detection of the black-and-white line region. In this embodiment, when an isolated picture block is included within a set of 5×3 blocks and the other blocks, surrounding the isolated picture block, are all detected as being a black-and-white line block, as shown in FIG. 8, the isolated picture block is changed to a black-and-white line block by the isolated picture block remover 38, thus increasing the accuracy of the segmentation of the black-and-white line region.

In order to avoid erroneous detection of an outline portion of the picture region, the picture block dilation part 39 performs a dilation process with respect to each of the picture blocks which are detected as being different from the black-and-white line block and as being an outline portion of the picture region. FIG. 9 shows a dilation process performed by the picture block dilation part 39. In FIG. 9, before the dilation process is performed, a block P (located in the left-side image at the center column and the third row) partially contains only a bit of a picture image, and the black-and-white line block discriminator 37 detects this block P as being a black-and-white line block. If the dilation process is not performed, a bi-level rendition process and a bi-level coding process are performed for the picture data in the block P, thus degrading the picture quality. Thus, in this embodiment, in order to eliminate such a problem, a dilation process is performed so that the picture region containing the picture blocks is enlarged as shown in the right-hand image of FIG. 9, and a boundary between the black-and-white line region and the picture region is changed as shown in FIG. 9. Therefore, it is possible to avoid the erroneous detection of the outline portion of the picture region and to improve the image quality.

According to the first embodiment, it is possible to accurately segment the original image into the black-and-white line region and the picture region. Since image data in the black-and-white line region is encoded through an encoding process appropriate for a bi-level text image, it is possible to improve the compression rate when encoding the image data. Also, the bi-level rendition process for image data in the black-and-white line region is performed after the sharpening process is performed, thus improving the quality of the black character image.

Figure 10:
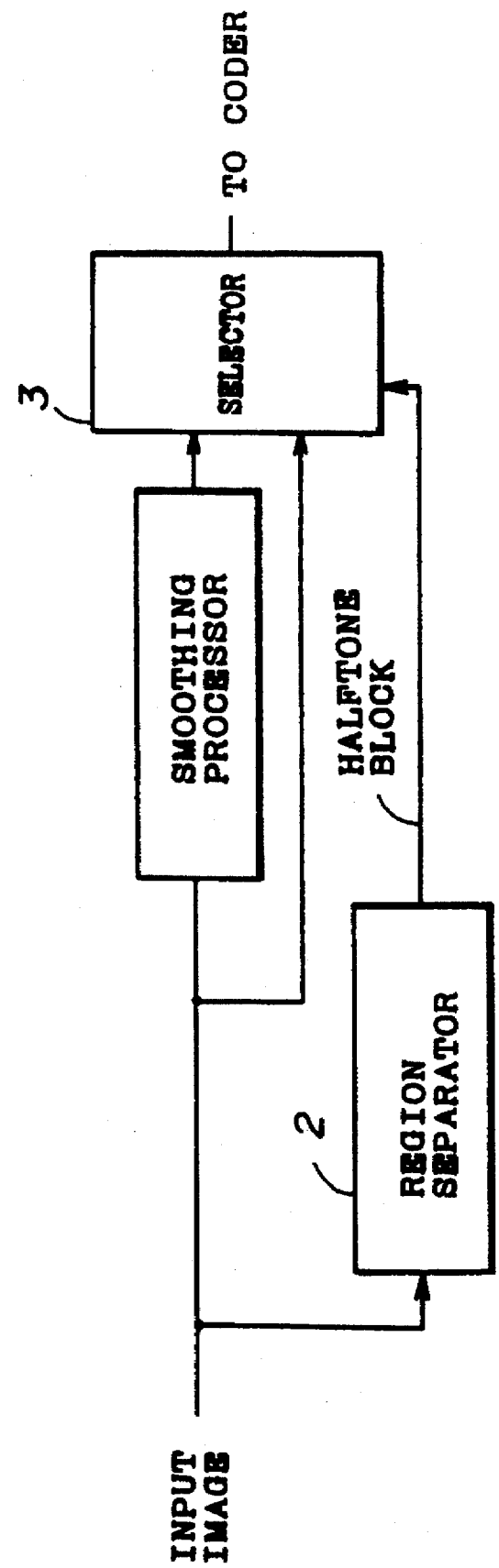
FIG. 10 is a block diagram showing another embodiment of the encoding part of the image processing system according to the present invention.

Next, a description will be given of a second embodiment of the encoding part of the image processing system according to the present invention, with reference to FIG. 10. Generally, a picture region separated from a color document image is described by halftone dots. Such a halftone image in the picture region has a given sampling frequency, and it is well known that the moire occurs in the output image when a digital encoding process is performed for the halftone image. Also, the halftone image includes a large amount of high-frequency factors, and it is difficult to efficiently achieve a high compression rate when applying the ADCT encoding process to the picture region. Thus, in order to prevent the occurrence of the moire and to efficiently improve the compression rate, it is desirable to perform an encoding process for image data in the picture region, which is detected as being different from the black-and-white line region by the region separator 2, after the smoothing process is performed therefor.

However, in the first embodiment described above, the smoothing processor 5 performs a smoothing process for a total of the image data in the picture region being received from the selector 3. This smoothing process is unnecessarily performed with respect to a color text image included in the thus detected picture region, and there is a problem in that the quality of the color text image (e.g. the sharpness of the color text) is degraded due to the performance of the smoothing process. Thus, in the second embodiment, in order to eliminate such a problem, the smoothing process is performed only for image data in a screened halftone region. As shown in FIG. 10, image data in a screened halftone block is supplied to a smoothing processor so that the supplied image data undergoes the smoothing process. In accordance with the region data regarding the screened halftone region, output by a region separator, a selector selectively supplies the image data in the screened halftone block to a coder after the smoothing process is performed. In this second embodiment, it is possible to eliminate the moire from the compressed image, to improve the quality of the color text image, and to achieve a high compression rate of a color document image.

Next, a description will be given of a third embodiment of the encoding part of the image processing system according to the present invention, with reference to FIG. 11. In the second embodiment described above, the smoothing process is performed only for image data in the screened halftone region. However, generally, when the number of lines per unit length of a graphic image is relatively large (e.g., 200 lines per inch), it is difficult to accurately discriminate between a screened halftone region and a continuous halftone region within a graphic image. For this reason, there is a problem in that an image distortion appears at a boundary between a region in which the smoothing process is performed and a region in which no smoothing process is performed.

In the third embodiment, a color text image is separated from the picture image and no smoothing process is performed for the color text image, and the smoothing process is performed only for image data in the screened halftone region or the continuous halftone region. The color text image refers to a color character on white background only, for which no smoothing process should be performed. In the third embodiment, a screened halftone image or another color text image which is a color character on color background is subjected to the smoothing process.

Figure 11:
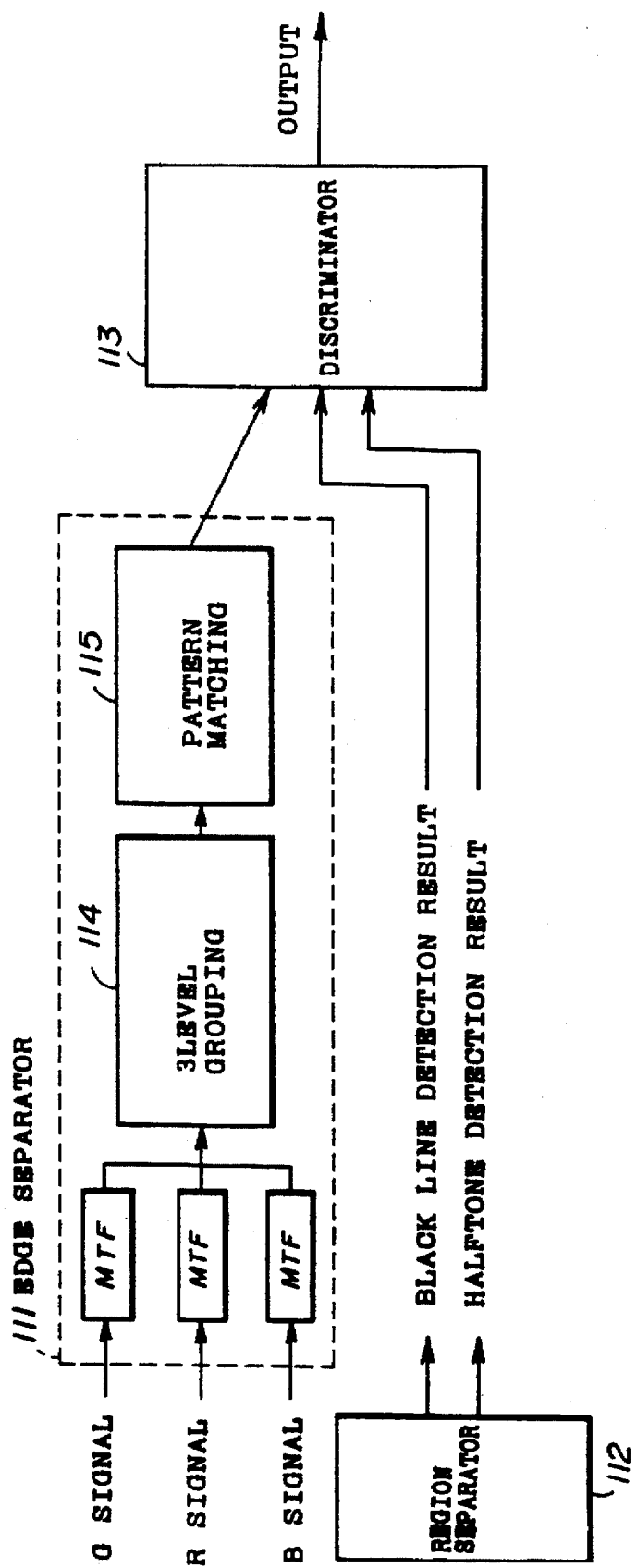
FIG. 11 is a block diagram showing a third embodiment of the encoding part of the image processing system.

FIG. 11 shows the third embodiment of the encoding part of the image processing system for separating a color text image from the original image (from a picture region). In the encoding part of FIG. 11, the color text image is separated from the original image by means of an edge separator 111 and a region separator 112. The edge extraction part 111 performs edge separation, and the region separator 112 performs black and non-black text detections and screened halftone detection. In accordance with the results of the edge separation and the detections, a discriminator 113 detects whether or not a target pixel of each block is a pixel of a color text region. This color text region pixel is detected only when three conditions are simultaneously satisfied; 1) the target pixel is an edge pixel, 2) the target pixel is a non-black pixel, and 3) the target pixel is a non-screened halftone pixel.

In the third embodiment, the black and non-black text detections and the screened halftone pixel detection are essentially the same as those of the region separator 2 of the first embodiment, a description thereof being omitted. Only the edge separation performed by the edge separator 111 differs. An edge pixel is separated from the original image by the edge separator 111 by making use of the three primary color signals of the original image. Each of the red, green and blue (RGB) signals of the original image is subjected to the MTF correction. On the basis of the correction data of the three primary color signals, a 3-level grouping part 114 groups each pixel of the original image into three different image data: black, gray and white data. A pattern matching part 115 determines whether or not the target pixel of each block is an edge pixel by performing a pattern matching with predetermined matrix patterns. This pattern matching procedure is essentially the same as described above. The above described 3-level grouping procedure is performed as follows.

(1) MTF correction data of R signal>TH1, MTF correction data of G signal>TH1, or MTF correction data of B signal>TH1 When the above conditions are satisfied, a value of the target pixel is set to 1 (which is grouped into a black pixel).

(2) MTF correction data of R signal<TH2, MTF correction data of G signal<TH2, and MTF correction data of B signal<TH2 When the above conditions are satisfied, a value of the target pixel is set to 0 (which is grouped into a white pixel).

(3) When neither the conditions (1) nor the conditions (2) are satisfied, a value of the target pixel is set to "x" (not equal to 0, 1) and grouped into a gray pixel.

In the above formulas, a value of TH1 is greater than a value of TH2. For example, TH1 is equal to 100 and TH2 is equal to 20. Therefore, in accordance with the results of the edge separation and the black-and-white line region and halftone region detections, the discriminator 113 discriminates a pixel of a color text region and outputs a signal indicating the discrimination result per pixel. Hence, it is possible to perform the smoothing process only with respect to pixels of the screened halftone region or the continuous halftone region (including no color text image).

Figure 12:
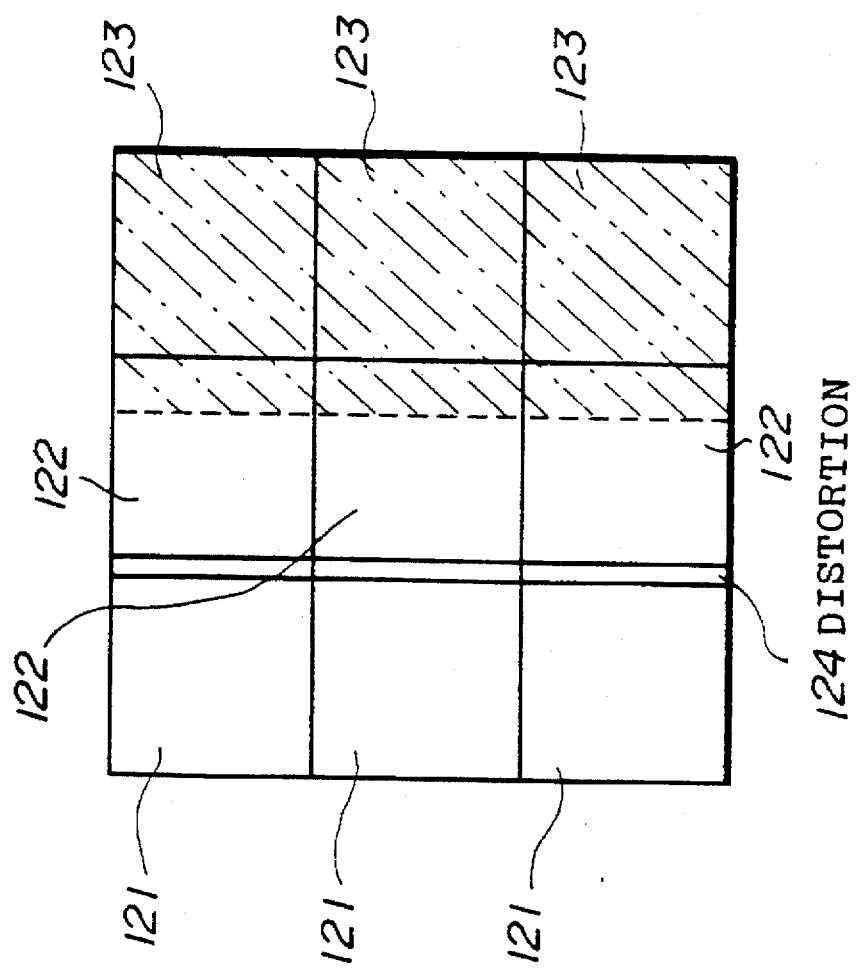
FIG. 12 is a diagram for explaining an image distortion appearing at a boundary between a text block and a picture block.

Next, a description will be given of a fourth embodiment of the present invention, with reference to FIGS. 12 through 17. FIG. 12 shows an image having a composite portion lying at a boundary between a text region and a picture region. As described above, image data in the text region is encoded or decoded as a bi-level image and image data in the picture region is encoded or decoded as a multilevel image. In FIG. 12, the text region includes a set of blocks 121 only, and the picture region includes a set of blocks 122 and a set of blocks 123. An edge portion of the actual picture lies at intermediate portions of the blocks 122. Although the blocks 122 contains a composite image in which a text image and a graphic image coexist, the region separator 2 detects each of the blocks 122 as constituting a picture region. White pixels of each of the blocks 122 are encoded or decoded as the multilevel image so that they have a certain gradation level. However, white pixels of each of the blocks 121 are encoded or decoded as the bi-level image so that they have gradation level "zero". For this reason, there is a problem in that the gradation of a reconstructed image does not continuously change and a distortion appears at boundary portions 124 between the blocks 121 and the blocks 122, seriously degrading the quality of a reconstructed image. Also, such a distortion may appear in the reconstructed image due to the erroneous segmentation of the internal part of the picture region.

Figure 13:
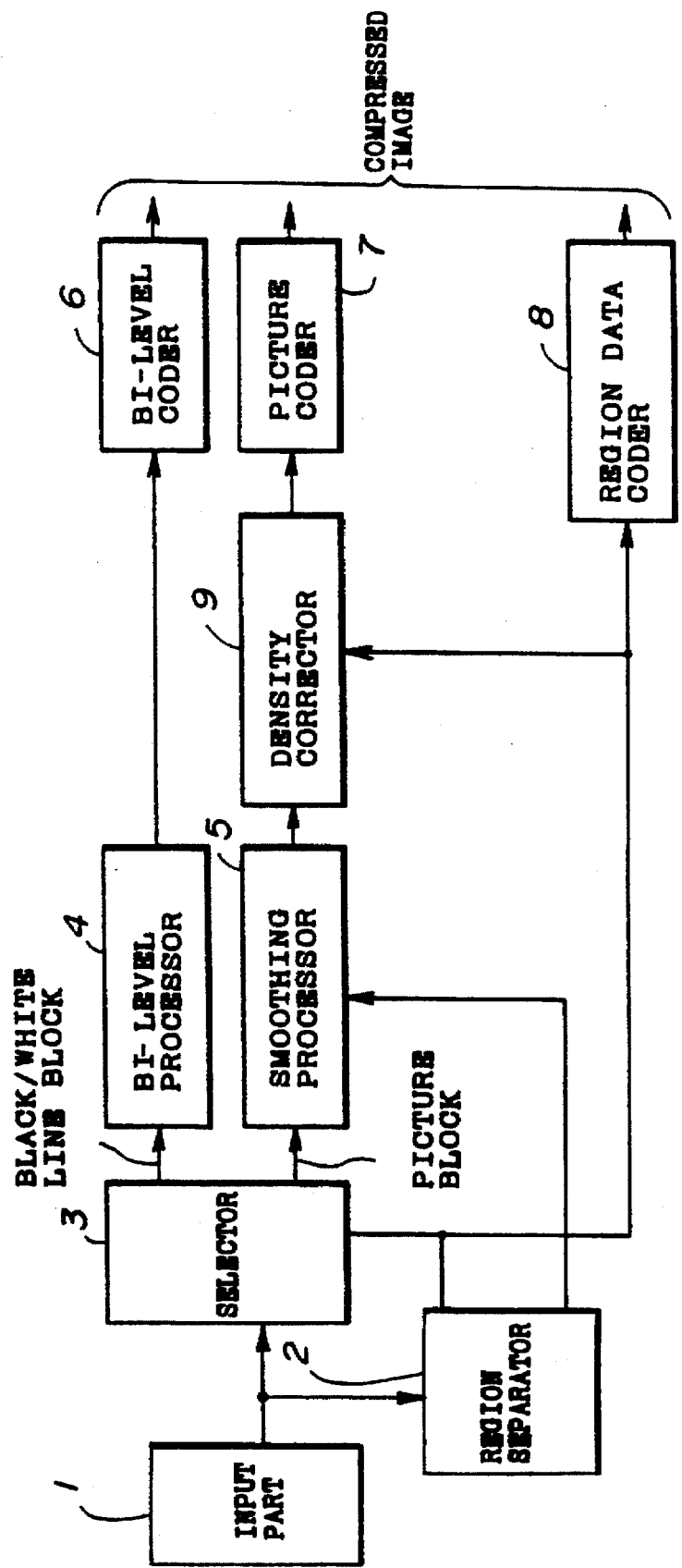
FIG. 13 is a block diagram showing a fourth embodiment of the encoding part of the image processing system.
Figure 14:
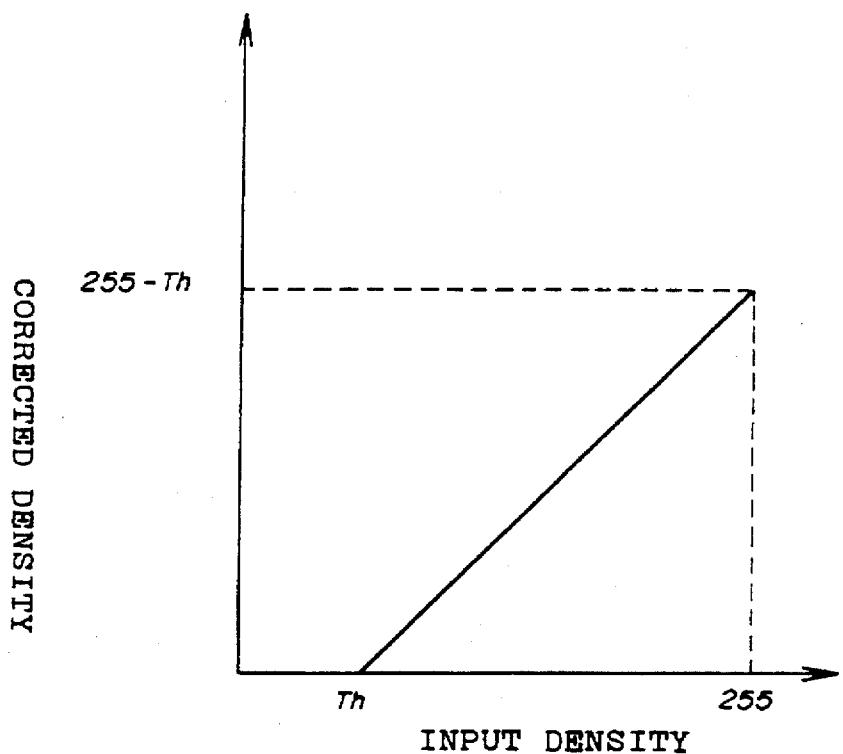
FIG. 14 is a chart for explaining a density correction process performed by the encoding part of FIG. 13.

FIG. 13 shows an improved encoding part of the image processing system in which a density correction process is performed before the encoding process is performed in order to eliminate the above mentioned distortion from the reconstructed image, thus improving the picture quality. In FIG. 13, those parts which are the same as those corresponding parts of FIG. 1 are designated by the same reference numerals, and only a density corrector 9 is additionally provided between the smoothing processor 5 and the picture coder 7. There are several methods to perform the density correction process by means of the density corrector 9. One of the methods is to perform the density correction process with respect to a total of the picture region. The input density levels with respect to the pixels in the picture region are totally shifted by a certain amount in a manner such that the input density levels lower than a predetermined threshold value Th (which is the same as the threshold value used for the white block detection) are made equal to zero. FIG. 14 shows a relationship between the input density level and the corrected density level. In accordance with this relationship, the density corrector 9 performs the density correction process for image data in the picture region. This action of the density corrector 9 allows white pixels of the picture region to have density level "zero", and no distortion appears at boundary portions between the text region and the picture region. Thus, it is possible to easily eliminate a distortion from the reconstructed image.

Figure 15:
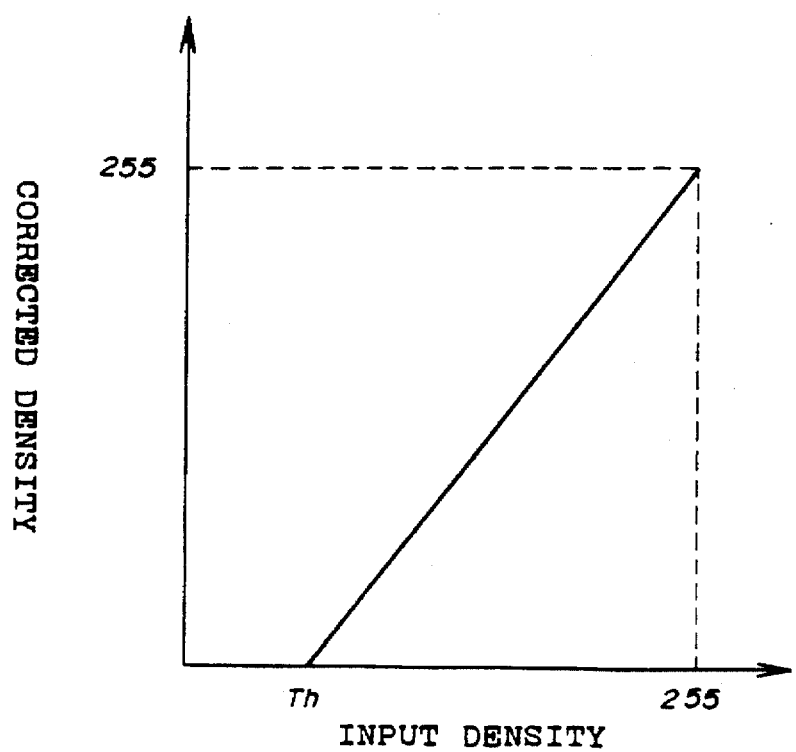
FIG. 15 is a chart for explaining another density correction process performed by the encoding part of FIG. 13.

However, in the case of the above mentioned method, the color of the picture region may be considerably changed from the color of the original image. In order to avoid the undesired color change, another method to perform the density correction process by means of the density corrector 9 is proposed. In this method, the input density levels with respect to the pixels in the picture region are not totally shifted but are corrected in a manner such that density levels lower than a predetermined threshold value Th (which is the same as the threshold value used for the white block detection) are made equal to level "zero" and the highest density level is maintained at the original level. The density corrector 9 of this method corrects the density level with respect to the pixels in the picture region by making use of a prescribed conversion table. FIG. 15 shows a chart defining a relationship between the input density level and the corrected density level, and the corrected density level described by the chart of FIG. 15 is determined through linear interpolation. Intermediate density levels with respect to the picture region are corrected in a manner such that the corrected density levels linearly and continuously vary between the level "zero" and the highest level "255" in accordance with the input density levels changing between the threshold level "Th" and the highest level "255". According to this method, it is possible to eliminate the above mentioned distortion without considerably changing the color of the picture region.

In addition, there is a still another method to perform the density correction process by means of the density corrector 9. In this method, the density correction process is performed with respect to the outline portion of the picture region in the vicinity of the text region in order for eliminating the distortion from the reconstructed image. First, the density corrector 9 detects whether or not a text region exists in the vicinity of a picture region. Then, the density corrector 9 measures a distance from the periphery of the text region with respect to each pixel of the picture region, and performs the density correction process for each pixel in accordance with the measured distance.

In accordance with the segmentation results output by the region separator 2, the density corrector 9 detects whether or not a text block exists in the vicinity of a target picture block. This detection is carried out by detecting whether or not a text block exists within an N×N block surrounding the target picture block. The segmentation results output by the region separator 2 include region data which is set to "1" when a target block constitutes a text region and is set to "0" when the target block constitutes a picture region. By taking a logical sum of the region data with respect to the N×N block, the presence of the text block can be detected. When the logical sum is equal to 1, the density corrector 9 detects that a text block exists in the vicinity of the target picture block.

Figure 16:
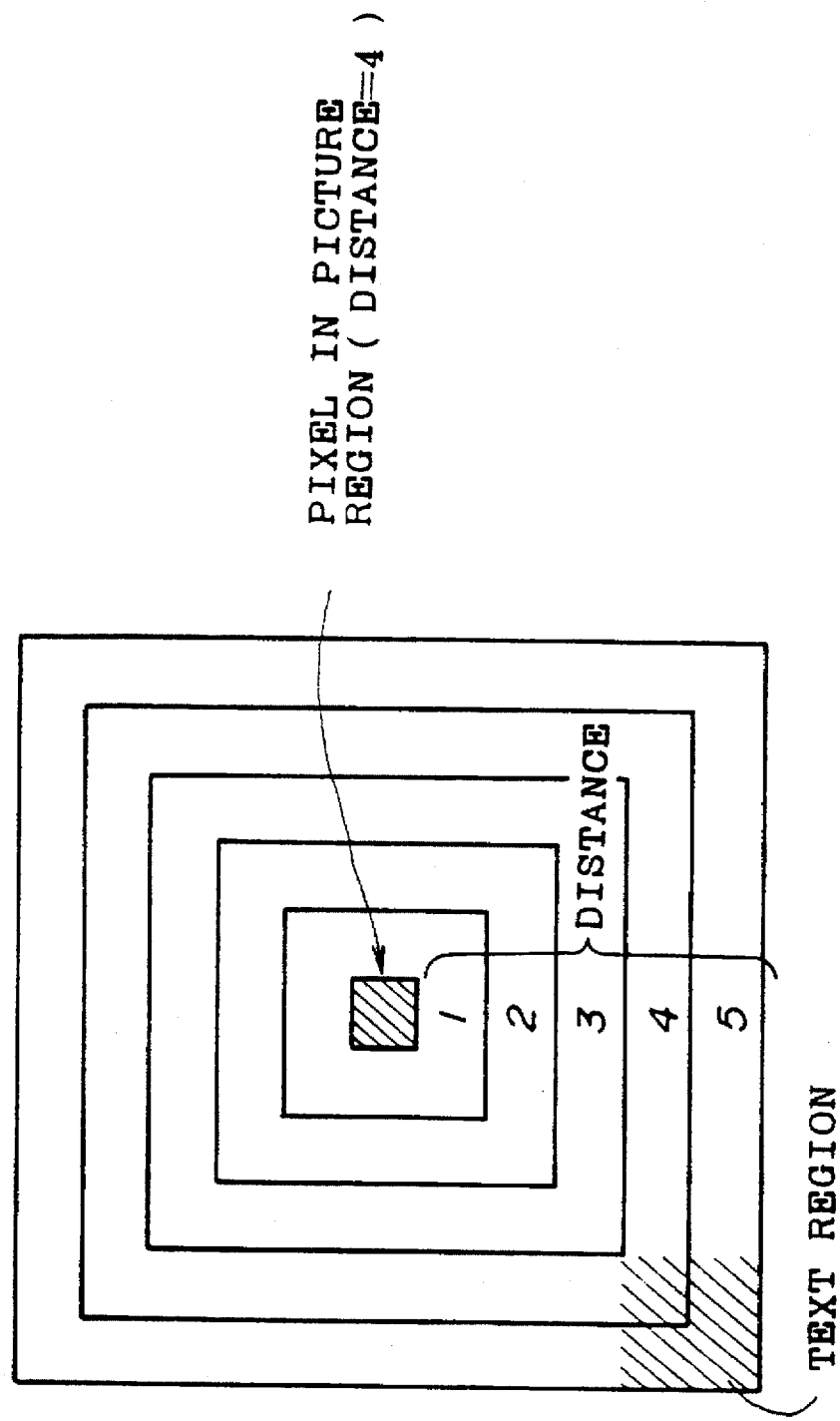
FIG. 16 is a diagram for explaining a step of determining a distance from a target pixel in a picture region to the peripheral pixel of a text region.

The density corrector then determines a distance from the periphery of the text block with respect to each pixel of the picture region, and corrects a density level of each pixel of the picture region in accordance with the determined distance. For example, assuming that Dmax is the maximum correction amount and L is the distance between the target pixel and the periphery of the text block, the amount D of density correction is represented by a formula D=Dmax−L. In this example, Dmax is the same as the above mentioned threshold value Th used for the white pixel detection. FIG. 16 shows a process of determining the distance between the target pixel and the adjacent text region. It is checked, sequentially from a pixel nearest to the target pixel in the picture region (at distance 1), whether or not the pixel constitutes a text region, and the distance is determined from the position of a pixel constituting a text region when it first occurs. In the case of FIG. 16, the pixel constituting a text region first occurs at distance 4, and the distance between the target pixel and the text block is determined as L=4. Assuming that the maximum correction amount Dmax is equal to 15, the amount of density correction with respect to the target pixel in the picture block is equal to D=Dmax−L=11. Thus, the density level of the pixel at distance 4 is corrected into a value which is determined by subtracting 11 from the original density level. According to the above method, it is possible to eliminate the distortion from the reconstructed image without considerably changing the quality of the internal parts of the picture region. Also, an outline portion of a picture region of a compressed image can also be suitably restored.

Figure 17:
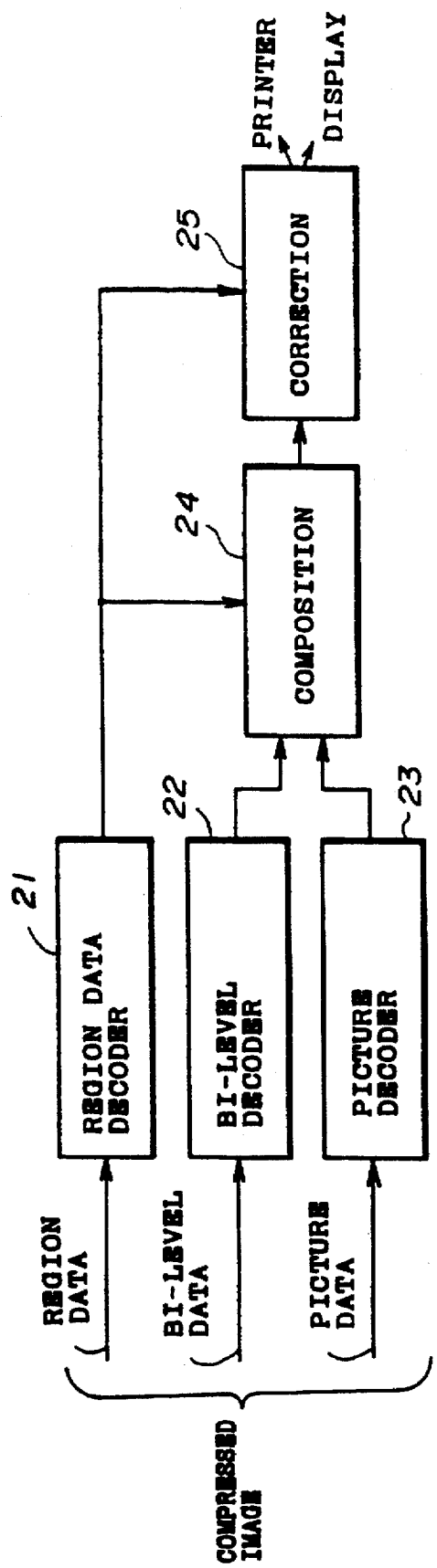
FIG. 17 is a block diagram showing another decoding system in which pixels of a reconstructed image are subjected to a density correction process after a decoding process is performed.

Finally, a description will be given of an improved decoding part of the image processing system in which a density correction process is performed after the decoding process is performed, in order to eliminate the above mentioned distortion from the reconstructed image, thus improving the picture quality. FIG. 17 shows a functional construction of such a decoding part. In FIG. 17, those parts which are the same as those corresponding parts of FIG. 2 are designated by the same reference numerals, and a correction part 25 is additionally provided. This correction part 25 performs the above described density correction process, and then performs the smoothing process with respect to pixels of the reconstructed image lying at boundary portions between the text region and the picture region, in order for eliminating the distortion from the image and improving the picture quality.

In accordance with the region data supplied by the region data decoder 21, the correction part 25 detects whether or not a target pixel lies at a boundary portion between a text region and a picture region within an M×N block. The region data is set to "1" when the target pixel constitutes a text region and is set to "0" when the target block constitutes a picture region. By taking a logical sum of the region data with respect to all the pixels of the M×N block, the presence of the boundary pixel pixels can be detected. In other words, when the logical sum is equal to 0, the correction part 25 detects that the target pixel lies at the boundary portion. The correction part 25 then performs the smoothing process with respect to the pixels lying at the boundary portion in order for eliminating the distortion from the reconstructed image. This smoothing process is carried out with respect to each M×N block, the size of which is the same as that of the M×N block used in the boundary pixel detection as mentioned above. According to the above decoding part, it is possible to eliminate a distortion from the reconstructed image, thus improving the quality of the reconstructed image. Also, the pixels at boundary portions between the text region and the picture region can easily be detected in accordance with the region data of each M×N block obtained as the result of the region separation.

Further, the present invention is not limited to the above described embodiments, and variations and modifications may be made without departing from the scope of the present invention.

What is claimed is:

1. An image processing system for subjecting an input image, red from a color document, to an adaptive image compression process which is appropriate for different types of image data in the input image, the input image including bi-level character image data and multilevel gradation color image data, the system comprising:

a) input means for reading the input image from the color document having a text image represented by the bi-level character image data and multilevel gradation image represented by multilevel gradation color image data;

b) region separation means, coupled to the input means, for separating the image into a plurality of elemental blocks of M×N picture elements, according to the type of image data contained in each elemental block, based on whether the elemental block constitutes a black line portion of the image or a halftone portion of the image, wherein each elemental block contains a predetermined number of picture elements arrayed in an M×N matrix formation and read by said input means, the region separation means including:

1) means for detecting an elemental block as having a black line portion of the image or a white background portion of the image, when both:

i) a sum of (A) a number of black edge picture elements contained in the elemental block and (B) a number of white picture elements contained in the elemental block, is greater than a predetermined value; and ii) no halftone picture element is contained in the elemental block; and 2) means for detecting elemental blocks as having a halftone portion of the image when:

i) the elemental block constitutes neither a black line portion of the image nor a white background portion of the image;

c) encoding means, coupled to the input means and the region separation means, for encoding image data of each elemental block to produce a compressed image, the encoding means including:

1) a first encoder for encoding image data of elemental blocks having black line portions, using a first encoding process appropriate for bi-level image data; and 2) a second encoder for encoding image data of elemental blocks having halftone portions, using a second encoding process appropriate for multilevel gradation image data; and d) correction means for carrying out, before the encoding process is performed by said encoding means, a density correction process with respect to picture elements contained in the elemental block constituting the picture portion of the image, so as to eliminate distortion from a reconstructed image, said correction means correcting a density level of each said picture element in a manner such that an amount of a difference between said density level and a corresponding corrected density level is determined in accordance with a distance from a periphery of the black line portion to a location of each said picture element, said picture elements for which said density correction process being performed lie at outline parts of the picture portion in the vicinity of the black line portion.

2. A method of enhancing a boundary area between a non-text portion and a text-only portion for image encoding, comprising the steps of:

a) segmenting the image into predetermined size blocks, each block containing image information on a predetermined number of pixels and a pixel value for each of said pixels;

b) determining each of said blocks as a picture-containing block or a text-only block, said picture-containing block including at least some non-text image;

c) identifying a boundary area containing at least said picture-containing block and said text-only block;

d) further determining whether said picture-containing block in said boundary area includes a portion containing only text, said portion defining a text extension portion;

e) enhancing a predetermined characteristics of at least said text extension portion; and f) encoding said the image based upon said steps b), c) and d).

3. The method of enhancing a boundary area according to claim 2 wherein said step d) further comprising the following steps of:

g) determining whether a pixel in said text extension area has said pixel value lower than a predetermined threshold; and h) based upon the determination in said step changing said pixel value to a blank dot value for representing a blank dot.

4. The method of enhancing a boundary area according to claim 3 wherein said step h) includes additional steps of:

i) determining a distance value in number of pixels between said pixel and said text-only block; and j) determining said blank dot value based upon a difference between a predetermined max value and said distance value.

5. The method of enhancing a boundary area according to claim 2 wherein said non-text image includes a half-tone image and a color character image.

6. The method of enhancing a boundary area according to claim 2 wherein said step d) further comprising the following step of subtracting a predetermined value from said pixel value for each pixel.

7. The method of enhancing a boundary area according to claim 2 further comprising a step of classifying said blocks into a picture region and a text region for generating a region boundary.

8. The method of enhancing a boundary area according to claim 7 wherein said region boundary is dilated for adjusting a boundary between said picture region and said text region.

9. A system for enhancing a boundary area between a non-text portion and a text-only portion for image encoding, comprising:

a block segmenter for segmenting the image into predetermined size blocks, each block containing image information on a predetermined number of pixels and a pixel value for each of said pixels;

a block selector for determining each of said blocks as a picture-containing block or a text-only block, said picture-containing block including at least some non-text image;

a boundary identifier for identifying a boundary area containing at least said picture-containing block and said text-only block;

a density correction unit for determining whether said picture-containing block in said boundary area includes a portion containing only text, said portion defining a text extension portion and for enhancing a predetermined characteristics of at least said text extension portion; and an encoder for encoding said the image in response to said density correction unit.

10. The system for enhancing a boundary area according to claim 9 wherein said density correction unit further comprising:

a threshold unit for determining whether a pixel in said text extension area has said pixel value lower than a predetermined threshold; and a pixel value modifier unit in response to said threshold unit for changing said pixel value to a blank dot value for representing a blank dot.

11. The system for enhancing a boundary area according to claim 10 wherein said pixel value modifier includes:

a distance determining unit for determining a distance value in number of pixels between said pixel and said text-only block; and a blank dot unit for determining said blank dot value based upon a difference between a predetermined max value and said distance value.

12. The system for enhancing a boundary area according to claim 9 wherein said non-text image includes half-tone image and color character image.

13. The system for enhancing a boundary area according to claim 9 wherein said density correction unit further comprises a uniform pixel value modifier for subtracting a predetermined value from said pixel value for each pixel.

14. The system for enhancing a boundary area according to claim 9 further comprising a region separator for classifying said blocks into a picture region and a text region for generating a region boundary.

15. The method of enhancing a boundary area according to claim 14 wherein said region separator dilates said region boundary for adjusting a boundary between said picture region and said text region.

16. A method of adaptively compressing digitized image data, comprising the steps of:

a) segmenting the digitized image data into predetermined-size blocks, each block containing image information on a predetermined number of pixels and a pixel value for each of said pixels;

b) determining each of said blocks as a picture-containing block or a text-only block and generating a block character signal indicative of the determination, said text-only block containing said image data representing only textual character images;

c) further determining said picture-containing blocks into a dilated picture region and a text region for generating a region character signal;

d) selecting a compression technique from a plurality of predetermined compression techniques based upon said block character signal and said region character signal; and e) compressing each of said blocks using said selected compression technique.

17. The method of adaptively compressing digitized image data according to claim 16 wherein said picture-containing image includes a half-tone image and a color character image.

18. The method of adaptively compressing digitized image data according to claim 16 wherein said compression techniques include an adaptive discrete cosine transform (ADCT) and a bi-level rendition process.

19. A system for adaptively compressing digitized image data, comprising:

a block segmenter for segmenting the digitized image data into predetermined-size blocks, each block containing image information on a predetermined number of pixels and a pixel value for each of said pixels;

a region separator connected to said block segmenter for determining each of said blocks as a picture-containing block or a text-only block and generating a block character signal indicative of the determination, said text-only block containing said image data representing only textual character images;

a picture block dilation part for further determining a dilated boundary between a dilated picture region and a text region in said picture-containing blocks and generating a region character signal;

a selector connected to said region separator for selecting a compression technique from a plurality of predetermined compression techniques based upon said block character signal and said region character signal; and an encoder connected to said selector for compressing each of said blocks using said selected compression technique.

20. The system for adaptively compressing digitized image data according to claim 19 wherein said region separator adjusts the predetermined size of said block by dilating a boundary between said blocks.

21. The system for adaptively compressing digitized image data according to claim 19 wherein said picture-containing block includes half-tone image and color character image.

* * * * *